US008559443B2

(12) United States Patent
Nielsen

(10) Patent No.: US 8,559,443 B2
(45) Date of Patent: Oct. 15, 2013

(54) EFFICIENT MESSAGE SWITCHING IN A SWITCHING APPARATUS

(75) Inventor: Jacob V. Nielsen, Virum (DK)

(73) Assignee: Marvell International Ltd., Hamilton (BM)

( * ) Notice: Subject to any disclaimer, the term of this patent is extended or adjusted under 35 U.S.C. 154(b) by 1556 days.

(21) Appl. No.: 11/187,236

(22) Filed: Jul. 22, 2005

(65) Prior Publication Data
US 2007/0019650 A1   Jan. 25, 2007

(51) Int. Cl.
H04L 12/56 (2006.01)

(52) U.S. Cl.
USPC ......... 370/395.4; 370/389; 370/360; 370/396

(58) Field of Classification Search
USPC ................... 370/424, 389, 347, 331, 397
See application file for complete search history.

(56) References Cited

U.S. PATENT DOCUMENTS

| 4,536,873 | A  | * | 8/1985  | Leete          | 370/424 |
| 5,404,537 | A  | * | 4/1995  | Olnowich et al.| 370/388 |
| 5,703,875 | A  |   | 12/1997 | Burnett        |         |
| 6,075,784 | A  | * | 6/2000  | Frankel et al. | 370/356 |
| 6,185,213 | B1 | * | 2/2001  | Katsube et al. | 370/397 |
| 6,452,926 | B1 | * | 9/2002  | Wiklund        | 370/388 |
| 6,545,996 | B1 | * | 4/2003  | Falco et al.   | 370/347 |
| 6,751,232 | B1 | * | 6/2004  | Patterson et al.| 370/459 |
| 6,970,478 | B1 | * | 11/2005 | Nishihara      | 370/474 |
| 7,065,580 | B1 | * | 6/2006  | Eberle et al.  | 709/232 |
| 7,177,309 | B2 | * | 2/2007  | Shinohara      | 370/389 |
| 2002/0181455 | A1 |   | 12/2002 | Norman et al. |         |
| 2003/0103501 | A1 |   | 6/2003  | Clem et al.   |         |
| 2003/0221043 | A1 | * | 11/2003 | Sota          | 710/317 |
| 2005/0047334 | A1 |   | 3/2005  | Paul et al.   |         |
| 2005/0135356 | A1 | * | 6/2005  | Muthukrishnan et al. | 370/389 |
| 2005/0135398 | A1 |   | 6/2005  | Muthukrishnan et al. |         |
| 2006/0285520 | A1 | * | 12/2006 | Venkitaraman  | 370/331 |

FOREIGN PATENT DOCUMENTS

EP    1 206 087 A2    5/2002

OTHER PUBLICATIONS

U.S. Appl. No. 10/898,540, filed Jul. 26, 2004, Nielson et al.

* cited by examiner

Primary Examiner — Dang Ton
Assistant Examiner — Pamit Kaur

(57) ABSTRACT

A system and method of transferring packets/cells and messages within a switching apparatus that includes a plurality of input units, a packet/cell switch element, a message controller, and a plurality of output units. It is identified as to whether or not an item to be transferred from one of the input units or output units to another of the input units or output units is a message or a packet/cell. If the item to be transferred is a packet/cell, the packet/cell is transferred from one of the input units to one of the output units using links dedicated for packet/cell transfer and a packet/cell switch element. If the item to be transferred is a message, the message is transferred from one of the input units or output units to another of the input units or output units using links dedicated for message transfer and a message controller.

25 Claims, 6 Drawing Sheets

• FIGURE 2

EFFICIENT MESSAGE SWITCHING IN A SWITCHING APPARATUS

BACKGROUND OF THE INVENTION

A. Field of the Invention

The invention relates generally to switching of messages in a packet/cell switching apparatus. The message switching is optimized for efficient switching of small messages, and is performed fully separated from the packet/cell switching.

B. Description of the Related Art

The input and output units of a general switching apparatus are connected respectively to the input and output links of a packet/cell switch element which resides inside the switching apparatus. Incoming packets/cells are switched from the input units to the output units via the packet/cell switch element in a packet and/or cell format. The typical packet format is a variable size frame with a typical size range from 32 to 10000 bytes, and the typical cell format is a fixed size frame with a typical size range from 32 to 80 bytes.

The input and output units of the switching apparatus may also require means for efficiently switching messages between the input and output units. Such messages are typically used for distributing information related to packet/cell input/output unit queuing status, packet/cell switching/scheduling credits, packet/cell flow control commands, and packet/cell control table state information. These messages are typically in the range of 2 to 16 bytes, which is smaller than the typical minimum packets and/or cell size. Furthermore, messages may be switched from input units to output units and vice versa, while packets/cells are typically only switched from input units to output units.

The packet/cell switch element is typically optimized for switching of packet and/or cells with a minimum size of 32 to 80 bytes, and therefore is inefficient for switching the smaller messages. One reason for this inefficiency is that a required switching header per packet/cell unit may be comparable in size to the message itself. The packet/cell switch element may also pad the size of the message up to a minimum packet/cell size, which also reduces the efficiency of the packet/cell switch element when used to switch small messages. It may also be a problem that when messages are switched across the packet/cell switch element together with packets/cells, the messages impact the packet/cell switching throughput and vice versa, and this results in non-deterministic switching performance for both messages and packets/cells.

One solution described in U.S. Patent Publication No. 2003/0103501 uses a separate ring element integrated inside a switch element to separate smaller messages from traffic data (packets/cells) which is switched across a crossbar. The ring element is constructed by successively connecting adjacent switch element links, forming a ring for passing the messages from an input link, successively through intermediate links, to the destination output link. The drawback of this approach is that although the messages and traffic data (packets/cells) use separate switching resources inside the switch element, they share the switch elements input and output links when passed to and from the switch element respectively. This structure means that the messages impact the switching of traffic data (packets/cells) and vice versa, which may result in non-deterministic switching performance for messages and traffic data (packets/cells).

Another solution described in patent U.S. Pat. No. 5,703,875 uses separate queuing resources inside a switch element to separate short control messages from longer data messages. Each input link has separate input queue resources to separate short and long messages, and all messages are switched using the same crossbar element. The drawback of this approach is that although the messages and traffic data (packets/cells) use separate queue resources inside the switch element, they share the switch elements input and output links when passed to and from the switch element respectively, and they also share the same crossbar element. This structure means that, the messages impact the switching of traffic data and vice versa, which may result in non-deterministic switching performance for messages and traffic data (packets/cells).

SUMMARY OF THE INVENTION

At least one aspect of the present invention performs efficient message switching inside a packet/cell switching apparatus, fully separated from the packet/cell switching.

According to one aspect of the invention, there is provided a method of transferring packets/cells and messages within a switching apparatus that includes a plurality of input units, a packet/cell switch element, a message controller, and a plurality of output units. The method includes generating a message at one of the plurality of input units and output units, the message destined for another of the input units and output units. The method also includes transferring the message, via the message controller and via one of a plurality of links dedicated for message transfer, from the one of the plurality of input units and outputs units, to another of the input units and the output units. The method further includes outputting a packet/cell scheduling request command from the one of the input units to the message controller, the packet/cell scheduling request command being transferred to the message controller from one of the plurality of input units using one of a plurality of links dedicated for message transfer within the switching apparatus. The method still further includes receiving the packet/cell transfer scheduling request command at the message controller, determining by the message controller when to allow transfer of the packet/cell, and notifying the one of the plurality of input units by outputting a packet/cell data acknowledging command from the message controller to the one of the plurality of input units over the one or another of the plurality of links dedicated for message transfer. The method also includes outputting the packet/cell from the one of the plurality of input units to the packet/cell switch element, by using one of a plurality of links dedicated for packet/cell transfer.

According to another aspect of the invention, there is provided a method of transferring packets/cells and messages within a switching apparatus that includes a plurality of input units, a packet/cell switch element, a message controller, and a plurality of output units. The method includes generating a message at one of the plurality of input units and output units, the message destined for another of the input units and output units. The method also includes transferring the message, via a message switch of the message controller and via at least one of a plurality of links dedicated for message transfer, from the one of the plurality of input units and outputs units, to another of the input units and the output units. The method further includes outputting a packet/cell from one of the input units to one of the output units, via the packet/cell switch element and via at least one of a plurality of links dedicated for packet/cell transfer, under control of the message controller.

According to yet another aspect of the invention, there is provided a system for transferring packets/cells and messages within a switching apparatus that includes a plurality of input units, a packet/cell switch element, a message controller which includes a packet/cell arbiter and a message switch, and a plurality of output units. The system includes a first plurality of input and output links for respectively connecting each of the input units and the output units to a packet/cell switch element. The system also includes a second plurality of input and output links for connecting each of the input and output units to a message controller. All packets and cells are transferred from the input units to the output units by way of the first plurality of input and output links and the packet/cell switch element, under packet/cell scheduling control including a first transfer of a scheduling request messages from one of the input units to the packet/cell arbiter by way of the second plurality of input links and then one of input units receiving a corresponding scheduling acknowledge messages back from the packet/cell arbiter by way of the second plurality of output links, and then a second transfer of the corresponding packet/cell to one of the output units by way of a first plurality of input and output links and the packet/cell switch element. All messages are transferred among the input units and the output units by way of the second plurality of input and output links, and the message switch.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

A switching apparatus according to a first embodiment of the invention includes a packet/cell switch element and a message controller. The switching apparatus enables efficient message switching via the message controller, fully separated from the packet/cell switching which is performed via the packet/cell switch element.

In addition to operating as a mechanism for enabling efficient message switching between the input and output units of the switching apparatus, the message controller performs a packet/cell scheduling arbitration by processing received requests messages from input units and generating and transmitting acknowledge messages back to input units for directing packets/cells across the packet/cell switch element.

The messages are transmitted to the message controller in a frame format. The frame format defines multiple message transmission timeslots per frame, and the position of each message transmission timeslot is fixed relative to the frame boundary. Although transmission delineation overhead is required per frame, it is not required per individual message transmission timeslot, thereby providing an efficient message transmission format with little overhead.

When a message arrives at the message controller, it will either be forwarded to the message controller's packet/cell arbiter or to the message controller's message switch, depending upon if the message is a packet/cell scheduling request message type or an message type which is to be exchanged between the input and output units of the switching apparatus respectively.

In a typical switching apparatus embodiment, the message controller's packet/cell arbiter will accept packet/cell scheduling request command messages and generate packet/cell scheduling acknowledge command message in return. The operation of the packet/cell arbiter is outside the scope of this invention, and will not be discussed in any detail herein, whereby the embodiments of the present invention are independent of the packet/cell arbiter.

The message controller integrates a message switch which is optimized for small messages. The message switch is typically optimized for smaller messages in the typical size range from 2-16 bytes. Since the message switch can be optimized for switching of very small messages independent of the packet/cell switch element, it is possible to integrate a highly efficient message switch.

The message controller's message switch includes a set of input message queues per input link, and a set of output message queues per output link, whereby these queues are connected via the inputs and outputs of a message crossbar, respectively. A message scheduler controls the switching of messages across the message crossbar, whereby the message crossbar is capable of simultaneously switching multiple messages from one or more input message queues, to one or more output message queues, on a per output link basis.

Figure 1:
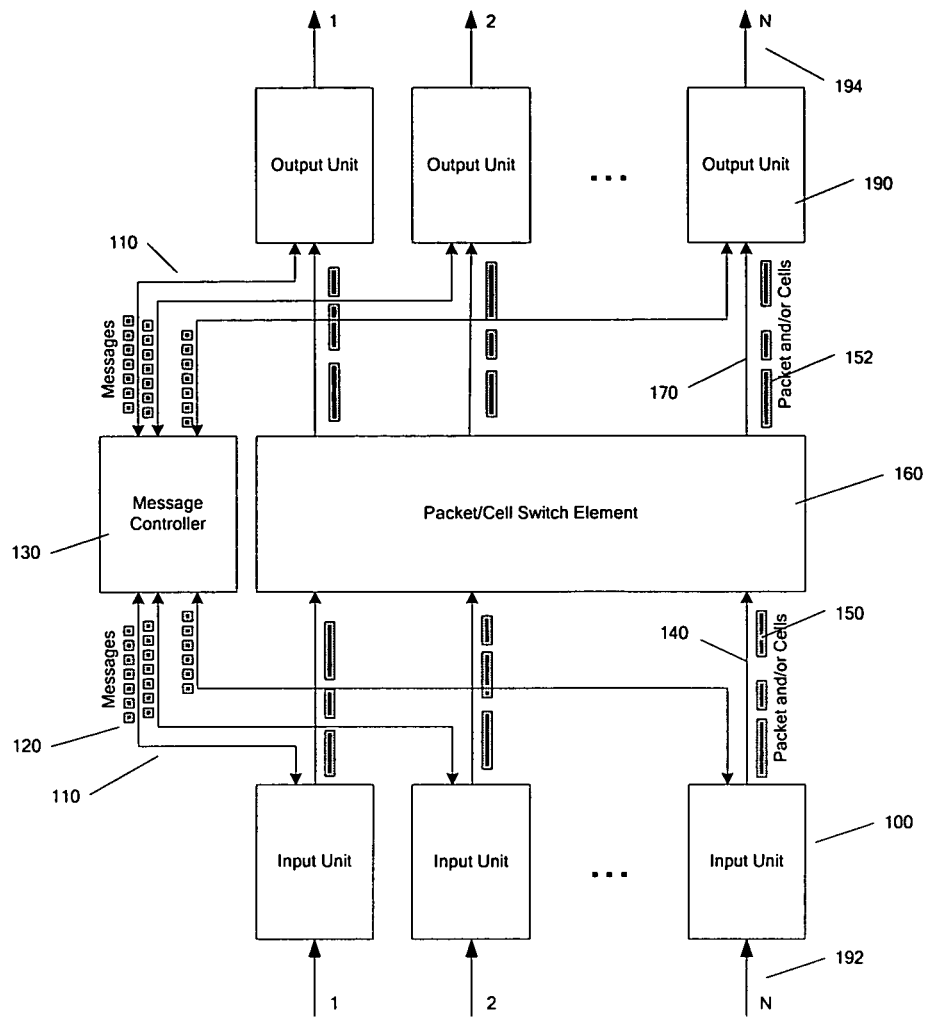
FIG. 1 shows a switching apparatus according to a first embodiment of the invention.

FIG. 1 shows components of an N×N switching apparatus according to a first embodiment of the invention (N is an integer value greater than one). The size of the switching apparatus may be other than N×N, such as M×N where M and N are different integers. The N×N switching apparatus includes N input ports 192, N output ports 194, N input units 100, N output units 190, a message controller 130, a packet/cell switch element 160, message input/output links 110, packet/cell input links 140, and packet/cell output links 170.

Each of the N input ports 192 receives packet and/or cells, and buffers them in their respective input units 100, in a manner known to those skilled in the art. Each input unit 100 connects to a packet/cell switch element 160 via one or more input links 140, and the packets and/or cells 150 are transmitted from the input units 100 to the packet/cell switch element 160 via these dedicated packet/cell input links 140. Each output unit 190 connects to a packet/cell switch element 160 via one or more output links 170, to transmit packets and/or cells 152 from the packet/cell switch element 160 to the output units 190 via these dedicated packet/cell output links 170, before final forwarding to their destination output port 194.

In addition to the connectivity between the input/output units and the packet/cell switch element, each input unit 100 connects to the message controller 130 via one or more input/output links 110 that are dedicated for bi-directional transfer of messages between the message controller 130 and the input units 100 within the N×N switching apparatus. An input unit 100 transmits messages 120 to the message controller 130 via one or more input/output links 110 that is dedicated for message transfer, and receives messages 120 from the message controller 130 via one or more input/output links 110 that is dedicated for message transfer. Similarly, each output unit 190 also connects to the message controller 130 via one or more input/output links 110 that are dedicated for bi-directional message transfer between the message controller 130 and the output units 190.

While FIG. 1 shows the input/output links 110 as bidirectional links (arrows at both ends), the individual links are preferably uni-directional with some of the links 110 dedicated for transfer of messages from the input/output units 100/190 to the message controller 130, while other links are dedicated for transfer of messages from the message controller 130 to the input/output units 100/190.

A packet/cell arbitration (scheduling) function is included in the message controller 130 for the embodiment structure shown in FIG. 1. The packet/cell arbitration function processes received requests messages from input units and generates and transmits acknowledge messages to input units for directing packets/cells from the input units across the packet/cell switch element for switching to an output unit, before final forwarding to their destination output port. The packet/cell arbitration function included in the message controller may cooperate with packet/cell arbitration functions embodied in one or more of the input units 100, one or more of the output units 190, or any combination of these components, depending on the specific switching apparatus embodiment.

A preferred implementation of the packet/cell switch element 160 is a single stage structure of parallel switch devices, scheduled such that packets/cells from the input units are distributed in parallel across these parallel switch devices.

In a preferred embodiment of the first embodiment, input unit L and output unit L are integrated into a single physical device. This way, the integrated input and output unit can share the same input link connecting to the message controller 130, which reduces the number of input/output links 110 on the message controller 130 by a factor of two.

Figure 2:
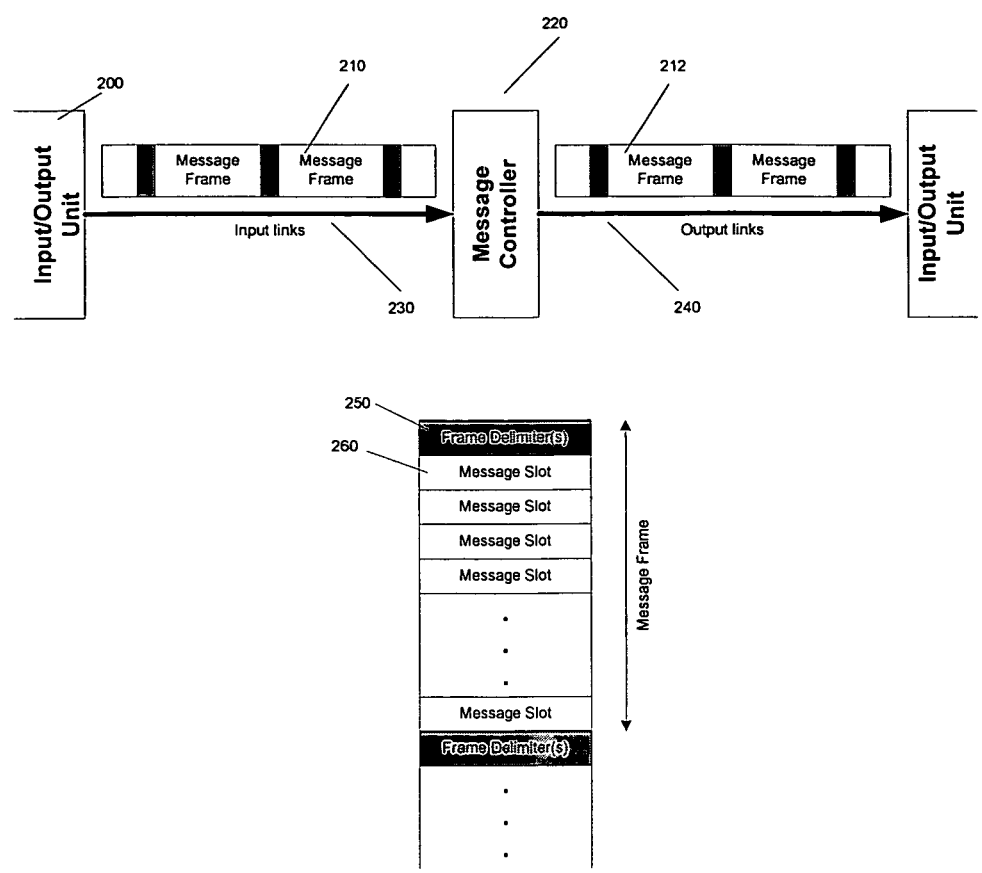
FIG. 2 shows the transmission format of messages to and from the message controller according to the first embodiment.

FIG. 2 shows the transmission format for the input links 230 and output links 240 of the message controller 130 according to the first embodiment. The input links 230 and the output links 240 are shown as uni-directional. Preferably, the transmission format is a frame format, and includes frames 210 transmitted across the input/output link. In a preferred implementation of the first embodiment, the frames are transmitted back-to-back, in which case the frame boundaries can be identified by a frame receiver using a start-of-frame indicator (frame delimiter) 250, and does not require end-of-frame indicators.

Each message frame defines a number of message transmission timeslots 260, wherein each message transmission timeslot 260 is used to transmit a message including empty messages. The position of each message transmission timeslot 260 is fixed relative to the frame boundary. A receiver does not need any transmission overhead per message to identify the message boundaries within received message frames.

The specific format of the different message types depends on the specific utilization of the N×N switching apparatus. In one particular implementation, the messages can divided into three general categories or types. The first type of messages is packet/cell scheduling request command messages which has been generated by an input unit (e.g., a request to transfer a packet/cell just received at the input unit to a particular output unit), and forwarded to the message controller 220, where they are processed and terminated by the packet/cell arbiter 350. This message type is only transmitted on the message controller's input links.

The second type of messages is packet/cell acknowledge command messages which has been generated by the message controller's packet/cell arbiter 350, and forwarded to an input unit for processing. This message type is only transmitted on the message controller's output links.

The third type of messages is messages which are generated by input/output units 200, and are switched between input/output units by being transparently switched across the message controller 220. This category also includes messages which are copied and replicated inside the message controller 220, and then being transmitted out of the message controller in multiple copies on different output links 240. This message type is transmitted on the message controller's input and output links.

The first embodiment can allocate the input link's message transmission bandwidth between the first and third message type by pre-assigning each of the message transmission timeslots 260 per input message frame 250 for one of the two message types. The optimal ratio between available input link transmission bandwidth for these two message types depends on the specific implementation of the switching apparatus, and can be modified as needed to suit that particular implementation.

The first embodiment allocates the output link's message transmission bandwidth between the second and third message type by pre-assigning each of the message transmission timeslots 260 per output message frame 250 for one of the two message types. The optimal ratio between available output link transmission bandwidth for these two message types depends on the specific implementation of the switching apparatus, and can be modified as needed to suit that particular implementation.

In one possible implementation of the first embodiment, the typical message transmission timeslot 260 size may vary depending on the type of message, whereby the message transmission according to the first embodiment can therefore be optimized by defining individual sizes message transmission timeslots for each of the corresponding message types.

In a preferred implementation of the first embodiment, the size of the message transmission timeslot 260 matches the corresponding message size in the switching apparatus embodiment, such that padding of the message information to match the size of the message to the message transmission timeslot size can be avoided.

Figure 3:
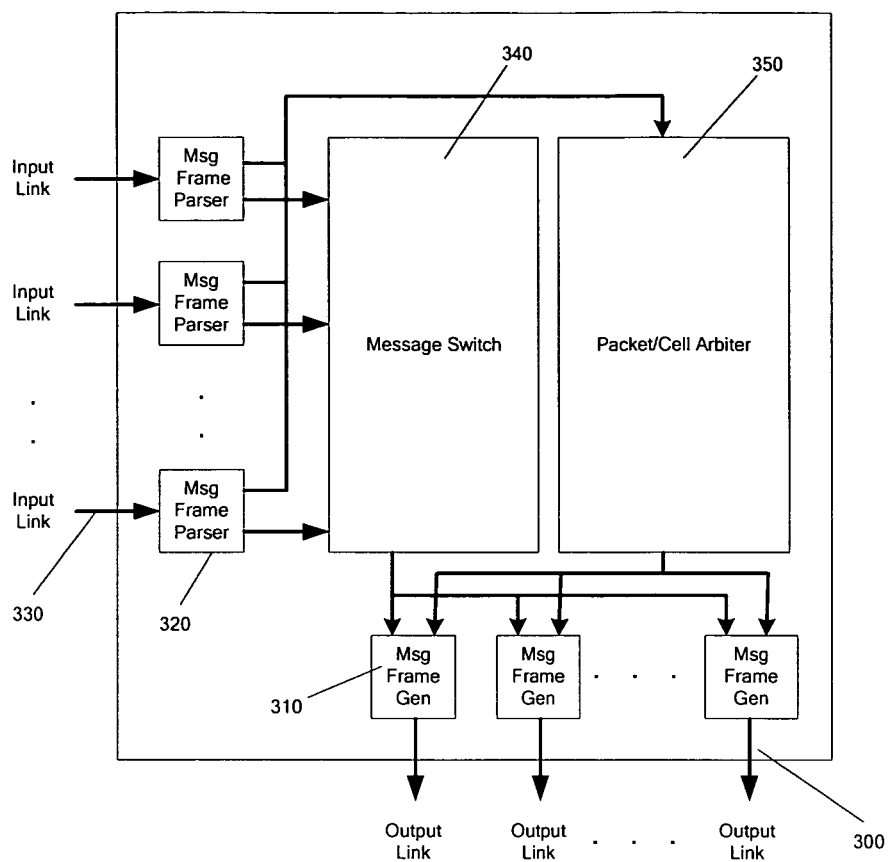
FIG. 3 shows a top-level block diagram of the message controller which includes a packet/cell arbiter and a message switch according to the first embodiment

FIG. 3 shows a block diagram of the message controller 130 as incorporated in the first embodiment of the present invention. Message frames arrive at the input links 330, and incoming messages are forwarded by the message frame parser 320 to either the message switch 340 or the packet/cell arbiter 350, depending on the individual message type. Messages are transmitted in message frames on the output links 300, and the message frames are generated by the message frame generator 310. The message frame generator 310 receives frames from both the message switch 340 and the packet/cell arbiter 350.

Figure 4:
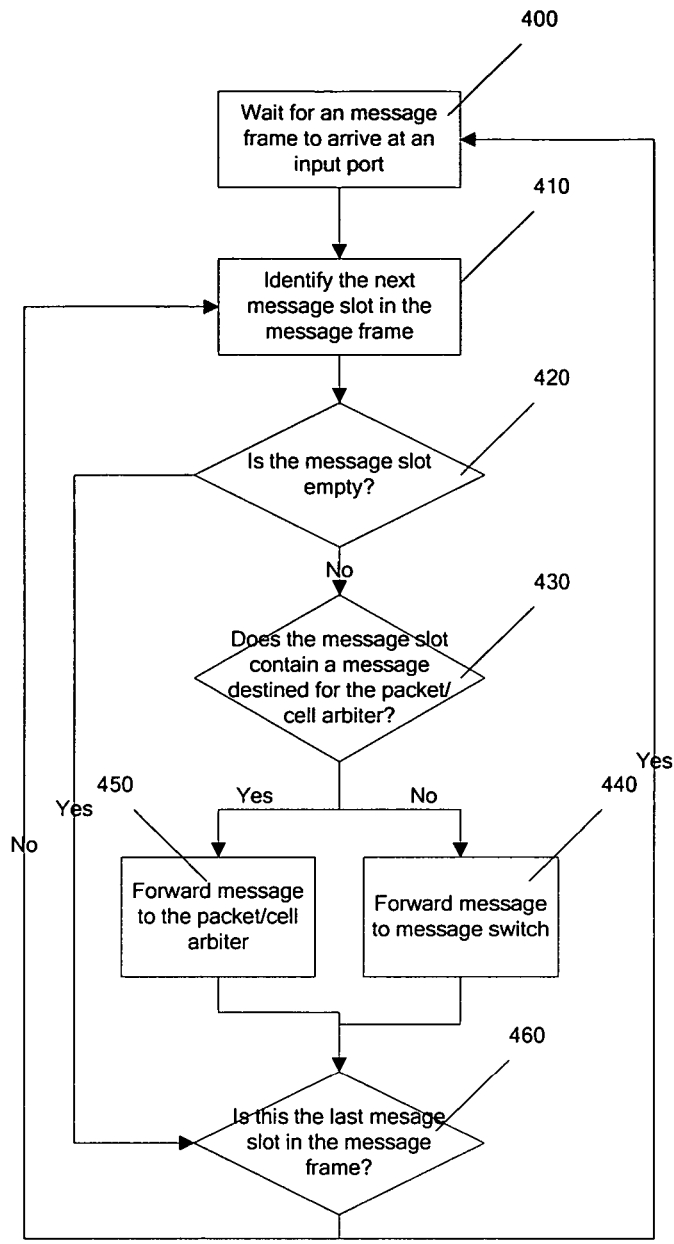
FIG. 4 shows a flow chart for the message controller's message frame parser function according to the first embodiment.

FIG. 4 is a flow diagram showing the functional operation of the message frame parser 320 shown in FIG. 3. A message frame arrives at the input link in step 400. In step 410, the message frame parser 320 will one by one identify the next message transmission timeslot in the message frame. In step 420, the method determines if the next message transmission timeslot is empty. If No, the flow goes to step 430; if Yes, the flow goes to step 460. In step 430, it is determined whether or not the non-empty message transmission timeslot contains a message destined for the packet/cell arbiter 350. If No, in step 440 the message is forwarded to the message switch 340; if Yes, in step 450 the message is forwarded to the packet/cell arbiter 350. In step 460, a determination is made as to whether or not the last message transmission timeslot in the message has been processed; if Yes, the process returns to step 400 to wait for another arbiter frame to arrive at the input link, and if No, the process returns to step 410 to identify the next message transmission timeslot in the current arbiter frame.

By such a method of message processing, incoming messages destined for the packet/cell arbiter 350 are forwarded to the packet/cell arbiter 350, and messages destined for an input/output unit 100/190 are forwarded to the message switch 340. When all message transmission timeslots in an incoming message frame have been processed, the message frame parser 340 waits for the arrival of the next message frame.

Figure 5:
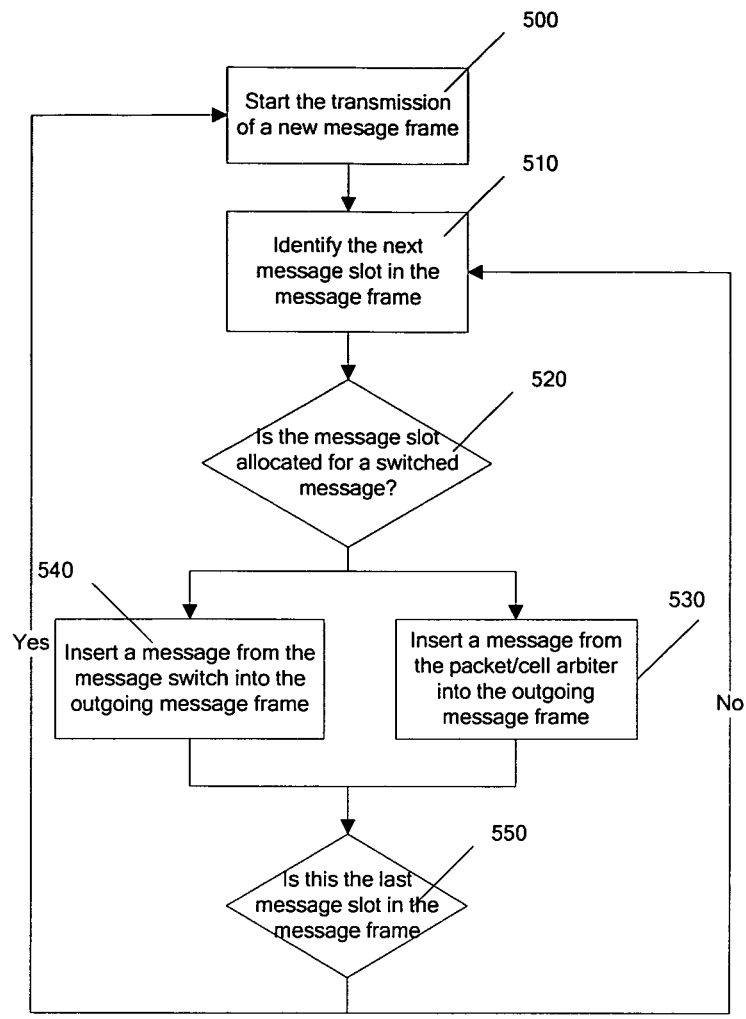
FIG. 5 shows a flow chart for the message controller's message frame generator function according to the first embodiment.

FIG. 5 is a flow diagram showing the functional operation of the message frame generator 310 shown in FIG. 3. In step 500, new message frames begin transmitting, whereby the messages frames are generated one-by-one. In step 510, a next message transmission timeslot in the message frame is identified. In step 520, it is determined whether or not the message transmission timeslot identified in step 510 is allocated for a switched message. If Yes, in step 540 a message is inserted from the message switch into the outgoing arbiter frame; and if No, in step 530 a message from the packet/cell arbiter 350 is inserted into the outgoing arbiter frame.

In other words, the method determines whether the message transmission timeslot is pre-assigned for the packet/cell arbiter or for the message switch. When a message transmission timeslot is pre-assigned for the message switch, a message from the message switch is inserted into the outgoing message frame in step 540. When a message transmission timeslot is pre-assigned for the message switch 340, but a message is not available from the message switch, an empty message is inserted into the outgoing message frame.

When a message transmission timeslot is pre-assigned for the packet/cell arbiter 350, a message from the packet/cell arbiter 350 is inserted into the outgoing message frame in step 530. When a message transmission timeslot is pre-assigned for the packet/cell arbiter 350, but a message is not available from the packet/cell arbiter 350, an empty message is inserted into the outgoing message frame. Step 550 determines whether or not this is the last message transmission timeslot in the message frame; if Yes the process returns to step 500, and if No the process goes to step 510 to identify the next message transmission timeslot in the message frame.

Figure 6:
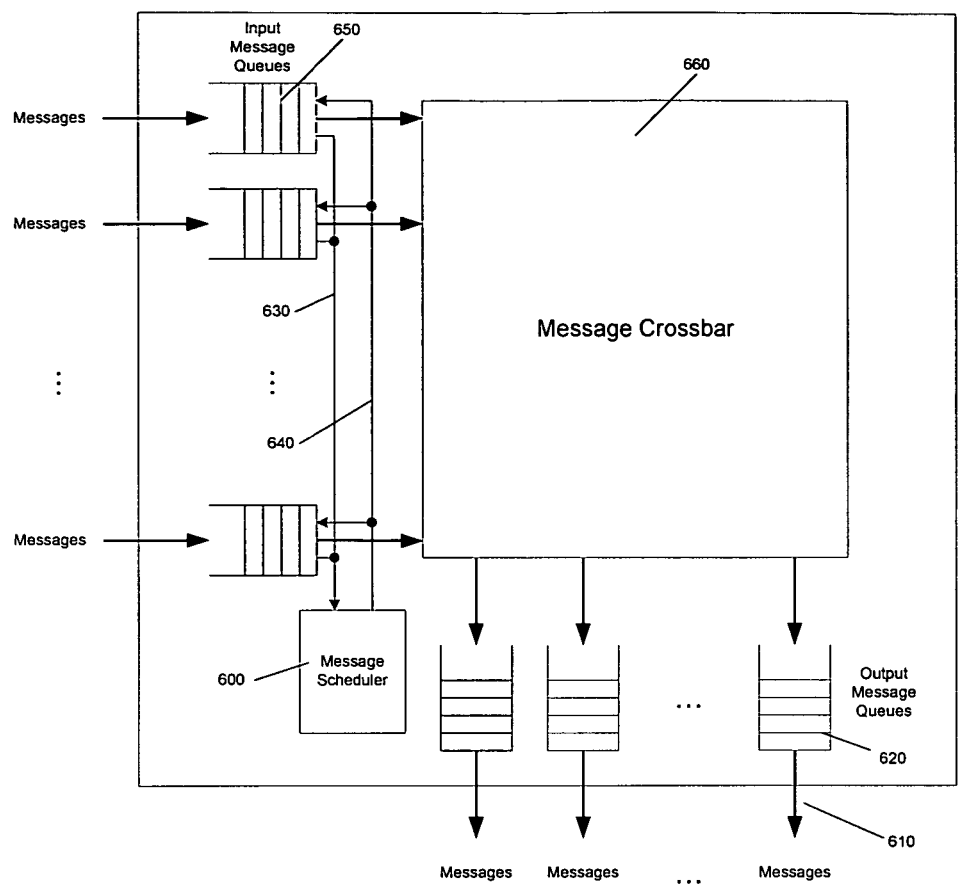
FIG. 6 shows a block diagram of a message switch inside the message controller according to the first embodiment.

FIG. 6 shows a block diagram showing components of a message switch 340 shown in FIG. 3. The message switch 340 is integrated into the message controller 130, and provides message switching between the message controller's input links to the message controller's output links.

The message switch 340 includes a message scheduler 600, a message crossbar 660, one message input queue 650 per input link, and one message output queue 610 per output link.

The message scheduler 600 determines when messages are switched from input message queues 650 to output message queues 620 via the message crossbar 660, and updates the message crossbar switching configuration accordingly every scheduling cycle.

The message crossbar 660 provides connectivity from any input message queue to any output message queue, and is capable of broadcasting from any input message queue 650 to all of the output message queues 620 (or to any particular subset thereof).

In a preferred implementation, the message scheduler 600 implements four parallel arbiters (not shown) per output message queue 620:

One arbiter selects between even numbered input message queues 650 in fixed ascending order.
One arbiter selects between even numbered input message queues 650 in fixed descending order.
One arbiter selects between odd numbered input message queues 650 in fixed ascending order.
One arbiter selects between odd numbered input message queues 650 in fixed descending order.

Arbitration is preferably only performed on the input message queues head-of-line message, and each input message queue can forward one message into the message crossbar per scheduling cycle. The four arbiters implemented per output message queue are capable of switching one or two messages originating from even numbered links plus one or two messages originating from odd numbered links to each output message queue per scheduling cycle. When the incoming messages are evenly distributed between even and odd numbered input links, the message scheduler is capable of switching up to four messages to each output message queue per scheduling cycle.

A message can be switched as a unicast message or as a broadcast message. Broadcast switching is preferably performed spatially, meaning that the switching may be performed across multiple scheduling cycles. Once the message has been switched to all output message queues, it is removed from the input message queue head-of-line position. In a best case scenario, complete broadcast can be performed in a single scheduling cycle.

The methodology of different embodiments of the present invention has now been described above. The following will describe different options and approaches for implementing the invention.

Another embodiment of a switching apparatus incorporating a message switching method and apparatus is similar to the first embodiment shown in FIG. 1, except that the output units 190 are not connected to the message controller 130. In this embodiment, the input units (but not the output units) can switch messages between themselves via the message controller 130. The input units can also forward packet/cell arbitration request command messages to the message controller's packet/cell arbiter 350, and receive and process packet/cell arbitration acknowledge command messages generated by the message controller's packet/cell arbiter.

A switching apparatus incorporating a message switching method and apparatus of the foregoing embodiments includes a packet/cell switch element 160 for switching packets/cells between input and output units. The present invention can be incorporated with any packet/cell switch element that can provide switching of packets and/or cells between the input and output units. As one example, the packet/cell switch element can be implemented as a structure that includes a single stage of parallel switch devices. Another possible implementation is a structure that includes multiple stages of switch devices.

The switch device for the packet/cell switch element can take on any of a number of forms that provide switching of packet and/or cells between the switch device input and output. Exemplary switch devices include crossbar switch devices, output buffered switch devices, crosspoint buffered switch devices, and switch devices embodied as described in U.S. patent application Ser. No. 10/898,540, entitled "Network interconnect Crosspoint Switching Architecture and Method", which is incorporated in its entirety herein by reference.

The message switch 340 can take on any number of forms that is able to provide switching of messages between the message controller's inputs and outputs. FIG. 6 depicts just one possible implementation of the message switch 340.

Numerous variations of the message switch may exist. For example, the message switch may be implementation to have the number of arbiters per output to be less or more than the four arbiters per output in the message switch.

Another possible variation of the message switch implementation may correspond to having each arbiter select in a round robin fashion between inputs, instead of fixed ascending/descending order selection between inputs. The message switch can be implemented to have each arbiter select between all inputs instead of only between odd or even numbered inputs.

Yet another variation of the message switch implementation may correspond to having the input and/or output message queues implement multiple priority queuing levels, and/or where the message scheduler schedules message across the crossbar according to these priorities, instead of a single message priority.

Still another variation of the message switch implementation has an output buffered structure where each output buffer accepts simultaneously arriving messages from all inputs.

Further, while FIG. 2 depicts a preferred transmission format for transmitting message between input/output units and the message controller, other formats exist. One contemplated variation is to incorporate a transmission format where the message frames are not guaranteed to be transmitted back-to-back. In this variation, the boundary of the message frame is identified using both start-of-frame and end-of-frame identifiers per frame.

In another variation of the message transmission format, the message transmission timeslots in the message frames are not pre-assigned for specific message types, but are instead dynamically assigned by the message frame generator to the different message types. A field embedded in each message is used to identify the type of the message being transmitted in a message frame's message transmission timeslot.

Thus, apparatuses and methods have been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention. Further, one or more aspects as described can be combined in any given system or method. Still further, one or more embodiments may be implemented in hardware, e.g., by a schematic design or a hardware description language (HDL), and/or implemented in a programmable logic device (FPGA/CPLD) or an ASIC, and/or they can be implemented in hardware using discrete hardware devices. Alternatively, one or more embodiments may be implemented in software.

What is claimed is:

1. A method of transferring packets/cells and messages within a switching apparatus, the method comprising:
   a) generating a message at a first unit of a plurality of input units and output units, the message destined for a second unit of the plurality of input units and output units;
   b) transferring the message from the first unit to the second unit via a message controller comprising a message switch;
   c) outputting a packet/cell scheduling request command from a requestor unit of the plurality of input units to the message controller;
   d) the message controller receiving the packet/cell transfer scheduling request command, determining when to allow transfer of the packet/cell, and notifying the requestor unit by outputting a packet/cell data acknowledging command; and
   e) responsive to the packet/cell data acknowledging command, the requestor unit transferring a packet/cell to one of the output units via a packet/cell switch element separate from the message switch,
   wherein all messages generated at one of the plurality of input units and output units, and destined to another of the plurality of input units and output units, are switched by the message switch, and wherein all packets/cells transferred from one of the plurality of input units to one of the plurality of output units are switched by the packet/cell switch element.

2. The method according to claim 1, wherein the determining in step d) is performed by a packet/cell arbiter of the message controller.

3. The method according to claim 1, wherein the plurality of input units and output units are connected to the packet/cell switch element by respective input links and output links dedicated for packet/cell transfer and not used to transfer messages.

4. The method according to claim 3, wherein the plurality of input units and output units are connected to the message controller by message input/output links dedicated for message transfer and not used to transfer packets/cells.

5. The method according to claim 1, further comprising:
   in a case where a plurality of messages are to be transferred within the switching apparatus, assigning message transmission timeslots to the plurality of messages to be included in a message frame;
   placing the messages in the respective assigned message transmission timeslots; and
   adding a frame delimiter for separating the message frame from a previous message frame.

6. The method according to claim 5, wherein the frame delimiter corresponds to a start-of-frame indicator or an end-of-frame indicator.

7. The method according to claim 5, wherein each message transmission timeslot has a size of from 2 bytes to 16 bytes.

8. The method according to claim 5, wherein the plurality of messages include:
   a) a first type of message generated by one of the input units and transmitted to the message controller,
   b) a second type of message generated by the message controller and destined for one of the input units, or
   c) a third type of message generated by the one of the plurality of input units and output units and destined for another of the plurality of input units and output units.

9. The method according to claim 1, wherein the message includes at least one of the packet/cell scheduling request command and the packet/cell data scheduling acknowledge command.

10. The method according to claim 1, wherein the message switch comprises a message scheduler and a message crossbar, the method further comprising:
    assigning messages to be transferred across the message crossbar, wherein the message assigning step is performed by the message scheduler.

11. The method according to claim 10, wherein the message scheduler comprises at least two message arbiters, the method further comprising: selecting, by a first of the two message arbiters, even numbered input messages arriving at the message controller in a fixed order; and selecting, by a second of the two message arbiters, odd numbered input messages arriving at the message controller in the fixed order.

12. A method of transferring packets/cells and messages within a switching apparatus, the method comprising:
    a) generating a message at one of a plurality of input units and output units, the message destined for another of the input units and output units;

b) transferring the message via a message switch from the one of the plurality of input units and outputs units to the another of the input units and the output units; and c) transferring packets/cells from at least one of the input units to at least one of the output units via a packet/cell switch element separate from the message switch, wherein all messages generated at one of the plurality of input units and output units, and destined to another of the plurality of input units and output units, are switched by the message switch, and wherein all packets/cells transferred from one of the plurality of input units to one of the plurality of output units are switched by the packet/cell switch element.

13. The method according to claim 12, wherein packets/cells are transferred from input units to the packet/cell switch element and from the packet/cell switch element to output units via respective links that are dedicated for packet/cell transfer and are not used to transfer any messages.

14. The method according to claim 13, wherein messages are transferred between the message switch and the plurality of input units and output units via respective message input/output links dedicated for message transfer and not used to transfer any packets or cells.

15. The method according to claim 12, further comprising:
in a case where a plurality of messages are to be transferred within the switching apparatus, assigning message transmission timeslots to the plurality of messages to be included in a message frame;
placing the messages in the respective assigned message transmission timeslots; and
adding a frame delimiter for separating the message frame from a previous message frame.

16. A switching apparatus, comprising:
a plurality of input units and a plurality of output units;
a packet/cell switch element; and
a message controller including a message switch separate from the packet/cell switch element,
wherein all messages generated at one of the plurality of input units and output units, and destined to another of the plurality of input units and output units, are switched by the message switch, and
wherein all packets/cells transferred from one of the plurality of input units to one of the plurality of output units are switched by the packet/cell switch element.

17. The switching apparatus according to claim 16, further comprising:
a first plurality of packet/cell input links to transfer packets/cells from respective input units to the packet/cell switch element; and
a second plurality of packet/cell output links to transfer packets/cells from the packet/cell switch element to respective output units.

18. The switching apparatus according to claim 17, further comprising:
a third plurality of message input/output links dedicated to transfer messages between the message controller and the plurality of input units and output units.

19. The switching apparatus according to claim 16, wherein the packet/cell switch element corresponds to a single stage structure of parallel packet/cell switch devices.

20. The switching apparatus according to claim 16, wherein the message switch performs message scheduling in a manner such that, in a case where a plurality of messages are to be transferred within the switching apparatus, the message switch assigns message transmission timeslots to the plurality of messages to be included in a message frame, the messages are placed in the respective assigned message transmission timeslots, a frame delimiter is added to the message frame for separating the message frame from a previous message frame.

21. The switching apparatus according to claim 20, wherein each message transmission timeslot scheduled by the message controller has a size of between 2 bytes and 16 bytes.

22. The switching apparatus according to claim 20, wherein each message frame is separated from a previous message frame by way of a frame delimiter, and wherein the message controller inserts the frame delimiter in a proper position within a plurality of message frames output by the message controller.

23. The switching apparatus according to claim 22, wherein the frame delimiter corresponds to a start-of-frame indicator or an end-of-frame indicator.

24. The switching apparatus according to claim 20, wherein the messages include at least one of a packet/cell data scheduling request command and a packet/cell data scheduling acknowledge command.

25. The switching apparatus according to claim 20, wherein the messages include:
a) a first type of message generated by one of the input units of the switching apparatus and transmitted to the message controller,
b) a second type of message generated by the message controller and destined for one of the input units of the switching apparatus, and
c) a third type of message generated by one of the plurality of input units or output units of the switching apparatus and destined for another of the plurality of input units or output units of the switching apparatus, in which the message switch is utilised to transfer the third type of message from source to destination.

* * * * *